(No Model.)

W. M. ERNST.
DISINFECTING WATER CLOSETS.

No. 317,634. Patented May 12, 1885.

WITNESSES:
Wm. H. Lowe
L. L. Frost

INVENTOR
William M. Ernst
BY
Frost & Coe
ATTORNEYS

UNITED STATES PATENT OFFICE.

WILLIAM M. ERNST, OF NEW YORK, N. Y.

DISINFECTING WATER-CLOSETS.

SPECIFICATION forming part of Letters Patent No. 317,634, dated May 12, 1885.

Application filed September 16, 1884. (No model.)

*To all whom it may concern:*

Be it known that I, WILLIAM M. ERNST, a citizen of the United States, residing at the city, county, and State of New York, have invented a new and useful Improvement for Disinfecting Water-Closets, of which the following, taken in connection with the accompanying drawings, is a full, clear, and accurate description.

The object of my improvement is to produce a new and improved way of disinfecting the water and refuse passing through the bowls of water-closets, whereby the water passing through the bowl of the closet shall be automatically disinfected.

The invention consists in placing a disinfecting-chamber provided with a perforated receptacle for holding disinfecting material between the water-closet and reservoir or tank, the disinfecting material being subject to the action of the water only while it is flowing from the reservoir to the disinfecting-chamber, and from said disinfecting-chamber to the water-closet; a connecting-pipe with means for regulating the flow of water through said pipe, a second pipe leading from the bottom of the disinfecting-chamber and connecting with water-closet. The disinfecting-chamber has a cap or cover through which it receives its supply of disinfecting material. In this way the water is mixed with the disinfectant and thoroughly impregnated with the same before reaching the bowl of the closet, and this without requiring any assistance or aid from the person using the closet.

Figure 1:
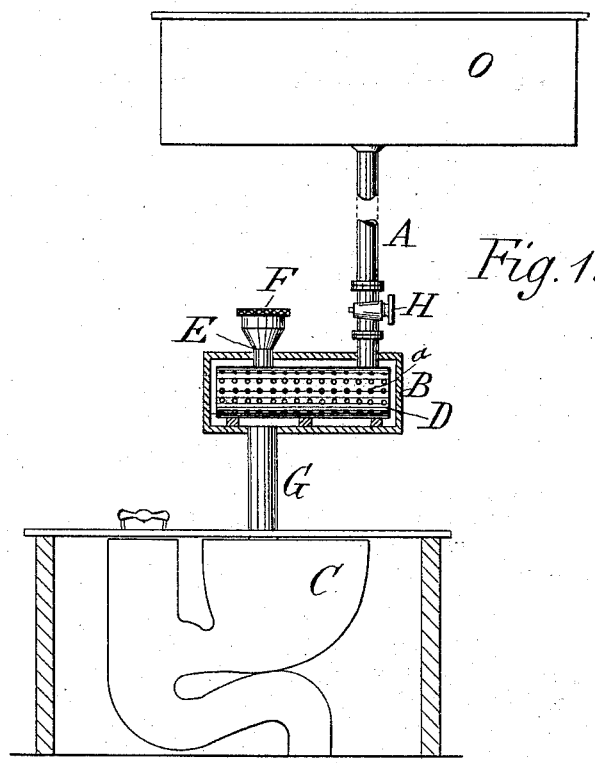
Figure 2:
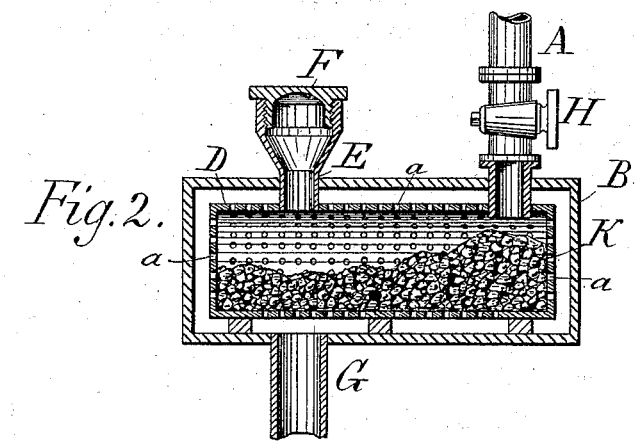

In the drawings, Figure 1 represents my improvement connected with the supply tank and bowl of a water-closet. Fig. 2 represents a sectional view of my improvement.

My improvement is made as follows: A represents a supply-pipe for conveying water from a water-tank, O, or other source of water-supply. B is a tank placed in any convenient manner between the water-supply tank and the bowl C of a water-closet. This tank is provided with a receptacle or inner chamber, D, which contains any proper and suitable disinfectant, K. The supply-pipe A connects such chamber D with the supply-tank containing water. The disinfectant is supplied to the chamber D through the pipe E, which is provided with the cap or cover F.

The chamber D is provided with the perforations or openings a, which allow free passage of the water into the chamber, and free passage of the water and disinfectant mingled therewith out of the said chamber. G is a discharge-pipe connecting the tank B with the bowl C of the water-closet. Through this pipe G the water, after being thoroughly mixed with the disinfectant, passes to the bowl of the water-closet. The pipe A is provided with a stop-cock, H, which can be turned so as to cut off the supply of water from the supply-tank when it is desired to cut the water off.

My improvement operates as follows: The stop-cock H being open allows the water to pass freely from the supply-tank down through the pipe A into the disinfectant-chamber D, which in its passage through such chamber is thoroughly mixed with the disinfectant contained therein. The water after being thus treated passes down through the openings in the chamber D into the lower part of the tank B, and thence, as desired, through the discharge-pipe G into the bowl C of the water-closet. When it is desired to furnish the chamber D with a fresh supply of disinfectant, the stop-cock of the supply-pipe A is turned so as to cut off the water from the supply-tank, and the cap or cover F is removed from the pipe E, and the disinfectant supplied through said pipe to the chamber D. After sufficient disinfecting material has been supplied to the chamber D, the water-supply is turned on by turning the stop-cock H, and the automatic disinfecting operation is resumed.

I do not limit myself to any particular form, size, or dimensions of the different parts of my invention, as these will readily be varied to suit the requirements of each particular case.

Having thus described my invention, what I claim, and desire to secure by Letters Patent, is—

1. The combination, with a water-closet and a reservoir or water-tank, of a disinfecting-chamber provided with a perforated receptacle for holding a disinfecting material intermediate the water-closet and reservoir or tank, a connecting-pipe intermediate the reservoir or tank and the disinfecting-chamber, provided with means for regulating the flow of water through said pipe, and a second pipe leading from the bottom of said disinfecting-chamber and connected with the water-closet, whereby the disinfecting material is subjected to the action of the water only while the water is flowing from the water-tank to the disinfecting-chamber, substantially as described.

2. The combination, with the reservoir or water-tank and the disinfecting-chamber provided with a perforated receptacle for the reception of a disinfecting material, of a connecting-pipe and a cock or valve intermediate such reservoir or tank and the disinfecting-chamber, whereby the flow of the water to the disinfecting-vessel may be regulated, substantially as described.

3. The combination, with the reservoir or water-tank and the disinfecting-chamber provided with a perforated receptacle for the reception of a disinfecting material, a supply-pipe, and a cap therefor, of a connecting-pipe intermediate the reservoir or water-tank and the disinfecting-chamber and a valve or cock located in said last-mentioned pipe, substantially as described.

In testimony whereof I have hereunto set my hand this 10th day of September, 1884.

WILLIAM M. ERNST.

In presence of—
CHARLES G. COE,
R. G. VAN BOSKERCK.